May 26, 1953  F. W. ZONS  2,639,554
METHOD OF AND APPARATUS FOR SEALING AMPOULES
Filed Aug. 18, 1950
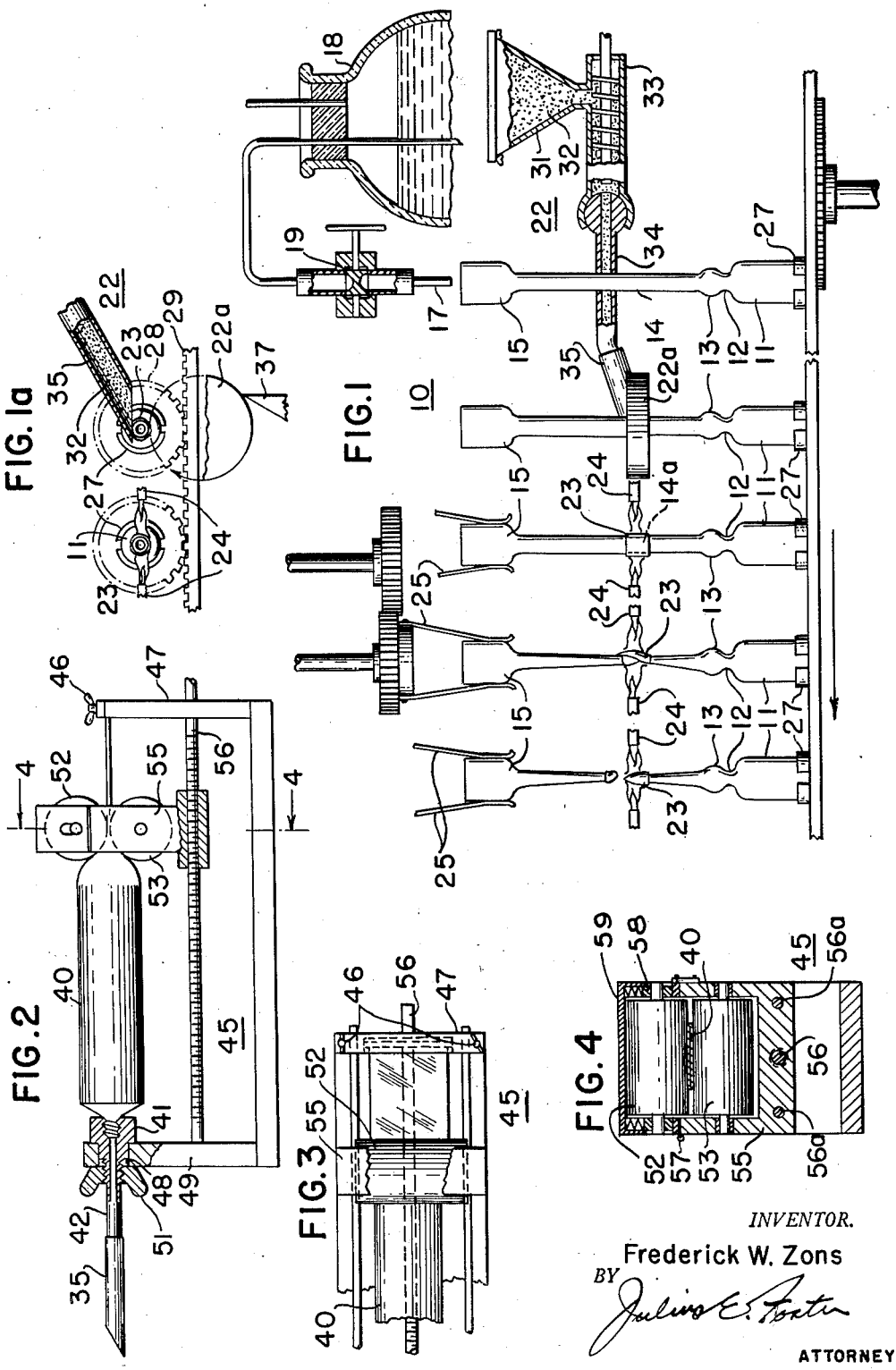
INVENTOR.
Frederick W. Zons
BY
ATTORNEY Patented May 26, 1953

2,639,554

UNITED STATES PATENT OFFICE 2,639,554

METHOD OF AND APPARATUS FOR SEALING AMPOULES

Frederick W. Zons, Brooklyn, N. Y.

Application August 18, 1950, Serial No. 180,158

19 Claims. (Cl. 49—1)

1

This invention relates to the art of sealing ampoules, and particularly to a process and to an apparatus for accomplishing such sealing operation.

The primary object of this invention is to provide a process for applying an identifying mark or index to an ampoule, after it has been filled, whereby it may not be mixed and confused with ampoules containing other solutions.

Another object of this invention is to provide such a process for applying the identification mark during the normal sealing operation to serve both as a complete safeguard of identification, and as an economical operation that adds but little to the cost of manufacture.

Another object of this invention is to provide a process to apply an identification mark by way of a color fused into the glass of the ampoule during the sealing operation, and thereby making it a permanent inseparable part of the ampoule.

Another object of this invention is to provide a process to apply such a mark that shall be fused and sealed into the glass tip of the ampoule, at the same time that the ampoule tip is formed and sealed, by the sealing flame which forms and seals the tip.

Another object of this invention is to provide an apparatus or an attachment for present commercial apparatus, for easily applying a marking material to an ampoule that is being processed for sealing.

A typical ampoule sealing machine presently in commercial use utilizes a rotary table or carriage for the ampoule to be sealed. An ampoule immediately after having been filled, is placed in such a machine and is caused to move through a predetermined path or orbit. During such movement, or during parts of such movement, it is desirable that the ampoule be caused to rotate. That aids and simplifies the sealing operation during which a closed tip is formed by an impinging heating flame at a narrow neck portion of the usual ampoule filling stem.

For the purpose of the present invention, it is desirable that the ampoule have such revolving movement composed of both translatory and rotary motions, in order to permit a marking medium to be easily applied by a wiping action peripherally to an area of the neck of the filling stem to which the sealing flame will be subsequently applied.

In accordance with the process herein, a suitable coloring medium is wipingly applied, or painted, onto the appropriate area of the neck of the filling tube immediately before the ampoule is moved to sealing position. Such application of the coloring medium is made while the ampoule is rotating, and a relatively thin uniform layer of that coloring medium is formed. The ampoule is then moved to sealing position, where the sealing flame is caused to play on the painted area of the neck of the filling tube. The heat of the

2 flame fuses the glass and the coloring medium, and, at the same time, while the ampoule is rotating, the upper part of the filling stem is held to prevent rotation, so the neck of the tube is twisted closed. While the flame is continuously applied at the area of the neck, the excess portion of the tube above the neck is removed, and the neck portion of the tube is sealed closed into a smooth tip with the coloring medium fused into the surface of the glass at the tip, where it is easily and readily seen as an identification mark.

The liquids that are usually placed in such ampoules may not be subjected to too much heat, lest some of the ingredients be evaporated or otherwise affected, and, for that reason, the time during which the sealing operation may be performed must be kept within safe limits, for example within an interval of forty seconds.

In the usual application of such colors, as on ceramic and other bases, the entire base object may be submitted to a high temperature and for an extended interval of time. However, in the application of a marking color to an ampoule, both the requirement of a safe temperature and the limited time of sealing impose strict limitations on the conditions under which such a color may be applied.

By applying a suitable marking material, and in such area as to utilize the direct heat of the sealing flame, the present process as disclosed herein may be effectively and successfully employed to mark an ampoule during the sealing operation and with the same flame that performs the sealing operation. In that manner all possibility of error is eliminated, since the identification is fused into the seal while the seal is being formed.

The manner in which the process is performed, and the manner in which the apparatus is constructed and operates, are illustrated in the accompanying drawings in which Figure 1 is a schematic view showing the several functional operations on an ampoule as it moves through the machine;

Figure 1-a is a schematic plan view of a portion of the machine of Figure 1 where the ampoule moves through the inking zone;

Figure 2 is a schematic side view of a different form of inking mechanism, employing an individual collapsible tube filled with the marking color material; and Figure 3 is a plan view of the rollers of Figure 2; and Figure 4 is an elevational side view of the rollers taken along lines 4—4 of Fig. 2.

In Figure 1 are shown the several operations that are performed sequentially in a typical machine for sealing ampoules. For simplicity and convenience of illustration, the construction features are shown schematically to indicate the function of each operation.

The ampoules may be filled on a separate independent machine, and then transported to, and inserted in the sealing machine, either mechanically or manually. For the purpose of the present description, the filling operation is schematically indicated, as an initial operation in the sequence.

As shown in Figure 1, an ampoule filling and sealing machine 10 is schematically drawn to show the several operations on an ampoule, from filling to sealing, and including the particular feature of the present invention, which is to mark the ampoule for identification to prevent subsequent mixing and confusion with other ampoules of similar appearance, but containing different solutions.

The ampoule here shown consists of a body or bottle 11, a severance neck 12, a head 13, a long narrow filling stem 14, and a funnel 15, all of glass.

The ampoule is filled from a suitable filling device shown as a thin conduit or needle 17 fed from a supply reservoir 18 and controlled by a manually or automatically controlled valve 19 to feed a predetermined quantity of fluid solution into the ampoule. The filled ampoule is then transported onto or placed on the machine 10, on a movable carrier 21 that moves continuously while the machine is in operation. In a machine of preferred type the carrier is a rotating circular table that carries and revolves the ampoules through a circular orbit. Figure 1 represents a development of the circular carrier, so the movement of the ampoules may be more readily illustrated for the several operations.

After the ampoule is placed on the carrier 21, several operations are performed, in sequence, as the ampoule moves through various zones. First the filling stem 14 is painted by a painting assembly 22 with a band of fusible colored material 23 around its periphery at a region 14-a, where the stem will subsequently be heated and fused to seal the ampoule.

After the band of material 23 is applied by being painted on the stem 14, the material may be thinned down and smoothened to remove any excess material, by a suitable device such as a roller 22-a, that engages and presses against the band of color material 23 while the ampoule is being revolved and rotated.

The ampoule is next moved to a first heating zone where a burner 24, with one or more flames, is positioned adjacent the stem of the ampoule, opposite the region 14-a covered by the marking paint band 23. The flames from burner 24 impinge on the stem 14 and paint 23 and heat the glass of the stem and the paint material to near the fusion point. At the same time, a pair of gripper jaws 25 move adjacent the funnel top of the ampoule to support it against falling. As the ampoule is moved through the next heating zone, the jaws 25 are moved to engage and grip the upper part of the ampoule, adjacent the funnel portion 15, and hold that part of the ampoule against rotation while the lower part of the ampoule is rotated and revolved through the heating zone. Due to the fused condition of the glass of the filling stem at the region 14-a, the stem is twisted and sealed closed by the fusion of the glass in that region.

At the same time, the ring of paint material 23 is also fused onto the glass and becomes a permanent integral part of that fused portion of the stem.

After such fusion, at that region of the filling stem, the grippers 25 lift and remove the upper part of the ampoule, which is now excess, and drop that excess part into a suitable positioned slide that leads to a waste receptacle, not shown here.

The rotational motion of the ampoule is indicated schematically as being accomplished by setting each ampoule in a suitable stirrup 27 that is supported on and carried by a toothed plate or gear 28 (Fig. 1-a) that is mounted for rotation on the carrier 21, and that engages a stationary rack 29 along the peripheral edge of the carrier 21. In an actual machine of this type, the gear 28 and the rack 29 are not employed. Instead, a simple circular confining rim, in arcuate sections, surrounds the circular table that serves as the carrier for moving the ampoules through their orbit, and the ampoule is rotated and revolved as it is rolled along the inner surface of that confining rim.

The color material which is to be applied to the ampoule stem is preferably an inorganic compound which will produce a colored flux, or a mixture of inorganic compounds which will produce a fused material of a particular desired color. The so-called ceramic colors are suitable as base colors, preferably those having a low melting point, within the range from 900 to 1200 degrees Fahrenheit.

One general type of mixture which has been found satisfactory is a powder mixture containing the color base well mixed with a flux including powdered borax glass and litharge (lead oxide), to be used with an oxidizing flame.

Generally the flux should be one with a fusion temperature between that of the glass of the ampoule and that of the color material base. In some instances, where the color base material had a higher fusion temperature than the glass of the ampoule the fused glass acted as a flux to aid in fusing the color. Some color material was thus available for use that had been considered unsuitable for use with glass ampoules with low fusion point. For example, materials that ordinarily needed a temperature of 1000 degrees F. for fusion, were effectively applied to mark glass at temperatures in the range 800 to 900 degrees F.

Such unexpected results were extremely important for sealing ampoules, where the temperature and time limitations must be observed.

In order to permit the color medium to be easily applied to the ampoule surface, the color medium is preferably made into a paste and held against the stem of a rotating ampoule. The paste then adheres to the glass stem until fusion of the color material and the glass is effected. The paste is formed with water rather than with a hydrocarbon diluent, in order to avoid residues that might affect the color of the color mark to be formed on the ampoule.

The paste thus formed is arranged to be applied to the ampoules by suitable means embodying an applicator and a supply reservoir of the color medium which serves as the painting or inking material.

The painting or inking arrangement 22, shown in Figure 1 includes a covered hopper 31 as a supply reservoir for receiving the inking paste 32, a conveyor screw 33 for moving the paste from the hopper 31 to a conduit 34 and thence into a rubber tip 35 at the outer end of the conduit 34. The rubber tip 35 engages and brushes the stem of each ampoule and applies a layer of the marking or inking material as a narrow band around the stem. The rubber tip is soft and yielding, so the lateral pressure against the ampoule stem is small. The inking paste is applied to the stem over an area that is to be heated by the sealing flame during the subsequent operation. The tip may therefore preferably be mounted to permit adjustable positioning of the tip along and against the stem of the ampoule, as indicated by way of example, by the ball and socket joint 36 adjacent the conveyor screw 33. The conveyor screw is connected to be driven from the main driving unit of the machine, and serves to feed a regular and fixed amount of the inking material to the tip 35, for each inking operation on an ampoule. A suitable intermittent gear train may be employed to drive the conveyor screw only during the actual interval of engagement between the tip and each ampoule.

The shape of the band of inking material, as applied to the ampoule stem, may be controlled by the external roller 22-a, shown in Figure 1-b, to produce a thin layer on the stem, or the orifice of the rubber tip may be shaped by a suitable confining element to shape the expressed marking material to desired width and thickness as applied to the stem. Where the external roller or an equivalent is used, a scraper 37 or similar element with wiping action is used to remove excess marking material that may adhere to the roller 22-a.

Where it may be desirable frequently to change the operation of a machine to provide an inking mark of a different color, the inking equipment may be of a type illustrated, for example, in Figs. 2, 3 and 4. The paste is put up in a collapsible tube 40, as an article of commerce, and the tube may be capped in the usual way until it is to be used. The tube 40 is then fitted with an adapter 41 having a tubular extension 42 onto which a rubber marking tip 35 is fitted, similar to that in Fig. 1. The paste is fed to the tip by compression of the collapsible tube.

Where such a tube is to be used for the inking material, a suitable mechanism is employed to progressively compress the tube and express the paste from the tube.

As shown in Fig. 2, one form of construction suitable for this purpose comprises a frame 45 of substantially U-shape, with a clamping means 46 to anchor the closed flattened end of the tube on one end wall 47 of the frame, and with an opening 48 in the other end wall 49 to receive the adapter 41 at the mouth of the tube. A thumb nut 51 serves to tighten the adapter in place to hold the front end of the tube steady, so the inking rubber tip 35 will stay in position where placed. In this case the proper level of the tip may be assured by the dimensions of the frame, or the frame, too, may be adjustably supported and anchored.

The paste is squeezed from the tube by two rollers 52 and 53, rotatably supported in a travelling frame 55 that is arranged to be moved longitudinally along the stationary frame 45, by a lead screw 56 that is connected through suitable gearing to the main driving power unit of the machine, to cause the tube to be compressed to feed the paste at the proper rate for the inking operation on the ampoules.

The use of the collapsible tube permits quick change for different inking colors, and also provides a simple way of keeping the paste in condition for ready use, since exposure to the air dries the paste and renders it difficult to move through a conduit. It is important that the paste made and used for this method and apparatus be kept fluid, and workable without excessive pressure.

To maintain proper pressure on the tube as it is progressively compressed, the two rollers 52 and 53 are shown to be spring biased toward each other by means shown here, by way of example, as simple springs 57 on the bearing blocks 58 of the top roller 52. The traveling frame 55 may be arranged so the top part 59 will pivot open to raise the upper roller 52 sufficiently to permit the closed end of a new tube to be disposed between the rollers 52 and 53 for the beginning of an operation. Any other suitable means may be employed to assure progressive compression of the collapsible tube to express the paste at a desired rate.

The color materials which have been employed herein, are those usually referred to as ceramic glass colors, in powder form. In forming a paste of the powdered material, only enough water is added to make the paste of such consistency as to be able to move or flow under light pressure, and to stick to the vertical surface of the ampoule where applied, but not sufficiently fluid to run off such surface.

In the case of the collapsible tube for supplying the color material paste to the painting or rubber tip, the double roller arrangement for progressively squeezing the paste out of the tube is intended to show one form of mechanism for that purpose. A single top roller has also been successfully employed, with the collapsible tube resting on a flat surface, and the roller progressively moved over the tube from rear to front to compress the tube and squeeze the contents out.

By putting up the paste in a commercial collapsible tube, ready for use, the water content is retained against evaporation, and the problem of cleaning the apparatus on replenishing a supply, or changing a color, is obviated. The weight of water used in making the paste is about thirty percent (30%) of the weight of the powdered mixture of color base and flux. That percentage of water has been found to be about right for various powdered color mixtures, to form a paste of satisfactory consistency.

In referring to the movement of the ampoules to various positions to be subjected to the functional operation corresponding to each such position, that term "position" is not intended to indicate merely a termination of movement, for the rest or dwell, but is intended to include also movement through a region or zone, while the corresponding function is being performed.

Thus various modifications may be made in the construction and arrangement of the various parts of the apparatus to perform the functions, and to operate in accordance with the method of the invention without departing from the spirit and scope of the invention, as set forth in the claims.

I claim:

1. The process of marking a glass ampoule at the time of sealing, which comprises applying a marking material to the ampoule at the area where the seal is to be formed, and then simultaneously heating said marking material and the area covered thereby to form a seal of the glass at said heated area with the marking material fused thereon.

2. The process as in claim 1, in which the color marking material is applied to the ampoule surface with a wiping action to form a layer of relatively uniform thickness.

3. The process as in claim 1, in which the ampoule is rotated about its axis and the color marking material is applied to the ampoule surface while the ampoule is being so rotated about its axis, so a ring of marking material will be applied to the ampoule before the ampoule is subjected to the sealing flame.

4. The process of marking a glass ampoule to prevent its confusion with filled ampoules that have similar appearing but actually different contents, which comprises applying a layer of a fusible metallic salt to an area of the ampoule filling stem where the stem is to be fused to seal the ampoule, and then simultaneously heating the salt layer and the stem to fuse the stem glass to form a closed seal and to fuse the salt at the seal to form a permanent identification for the ampoule with its contents.

5. The process as in claim 4, in which the marking material applied to the stem consists of a ceramic color paste.

6. A machine for sealing a glass ampoule having a filling stem symmetrical about a longitudinal axis, said machine comprising an ampoule support; means for moving the support with the ampoule successively to several operating positions including a fusing and sealing position and simultaneously rotating the ampoule about its axis; and means operating with the moving support for applying a marking material to a predetermined limited area of the filling stem of the ampoule while the ampoule is moving between two operating positions and rotating before subjecting the stem to heat to fuse and close the stem to seal the ampoule and to fuse the marking material to the stem.

7. A machine as in claim 6, in which the applying means comprises a supply reservoir for the marking material, a contacting applicator for applying a thin layer of the material from the reservoir onto the surface of the filling stem of the ampoule, and a feeder for moving the material from the supply reservoir to the applicator.

8. A machine as in claim 7 in which the applicator consists of a rubber tube having one end open to emit the material onto the filling stem and the other end fed from the supply reservoir.

9. A machine as in claim 7 in which the feeder consists of a conveyor screw.

10. A machine as in claim 7, in which the supply reservoir consists of a collapsible tube containing the marking material, and the feeder consists of means for progressively squeezing the marking material from the collapsible tube into the applicator.

11. A machine as in claim 7 comprising means by which the filled ampoule with its tubular filling stem is rotated about the axis of the filling stem while the applicator contacts said filling stem to apply the marking material.

12. A machine as in claim 6, comprising, further, heating means for fusing and sealing the filling stem of a filled ampoule and simultaneously fusing the previously applied marking material onto the glass of the stem.

13. A sealing machine for ampoules respectively having a filling stem, comprising a travelling carrier for receiving a filled ampoule that is to be sealed, and for moving the ampoule to progressively spaced operating positions including sealing position while rotating the ampoule around its axis; means for rotating the ampoule about its axis; means for applying a color material to the ampoule during its rotation and movement in advance for reaching said sealing position; and means for subjecting the ampoule and the color material to a flame to form the seal and simultaneously to fuse the color material onto the ampoule.

14. An ampoule marking and sealing machine as in claim 13, comprising, in addition, means for shaping the color material on the ampoule to distribute said color material in predetermined area and thickness on the ampoule prior to sealing.

15. An ampoule marking and sealing machine as in claim 14, comprising, in addition, means for cleaning said shaping means after a shaping operation, to remove any excess color material that may be adhering to the shaping means.

16. An ampoule marking and sealing machine as in claim 15, in which the shaping means embodies an element biased to press against the color material as the ampoule revolves through a portion of its path of travel; and in which said cleaning means cleans the biased pressure element after a shaping operation.

17. A machine as in claim 16, in which the biased element of the shaping means consists of a rotatable disc; and supporting means for the disc to hold the peripheral edge of the disc against the color material on a passing ampoule.

18. The process of marking a glass ampoule for identification during the sealing operation, which comprises applying a thin layer of a coloring medium to the area of the filling stem of an ampoule where the stem is to be heated and fused to form a closed sealing tip, the coloring medium having a fusing point normally higher than the fusing point of the ampoule glass; playing a heating flame on the filling stem in the region covered by the coloring medium in order to fuse the glass of the filling stem where it is covered by the coloring medium; and then continuing to heat the coloring medium while the fused glass of the stem acts as a flux to reduce the fusion point of the coloring medium and to cause that medium to soften and fuse into the fused glass of the stem; and simultaneously twisting the stem to close the stem at such fused region and to form a seal; and then removing the excess of the stem from above the sealing tip that is thus formed by the fused glass of the stem and the fused coloring medium thereon.

19. An ampoule marking and sealing machine as in claim 13, in which the means for applying the color material to the ampoule includes a rotatable disc for pressing and distributing the color material in a predetermined area on and around the filling stem of the ampoule prior to the sealing operation.

FREDERICK W. ZONS.

References Cited in the file of this patent

UNITED STATES PATENTS

| Number | Name | Date |
|---|---|---|
| 276,897 | Schulze-Berge | May 1, 1883 |
| 1,967,603 | Zimber | July 24, 1934 |
| 2,037,989 | Macklanburg | Apr. 21, 1936 |
| 2,044,566 | Cory | June 16, 1936 |
| 2,097,233 | Meston | Oct. 26, 1937 |
| 2,258,408 | Cozzoli | Oct. 7, 1941 |
| 2,270,152 | Themak | Jan. 13, 1042 |
| 2,414,781 | Wacker | Jan. 21, 1947 |
| 2,421,801 | Miller | June 10, 1947 |
| 2,457,158 | Koch | Dec. 28, 1948 |
| 2,464,765 | Palmer | Mar. 15, 1949 |
| 2,481,474 | Goodman | Sept. 6, 1949 |
| 2,506,866 | Gehrke | May 9, 1950 |
| 2,512,929 | Galbraith et al. | June 27, 1950 |